(12) United States Patent
Saito et al.

(10) Patent No.: US 6,436,567 B1
(45) Date of Patent: Aug. 20, 2002

(54) SEPARATOR FOR FUEL CELLS

(75) Inventors: Kazuo Saito; Atsushi Hagiwara; Fumio Tanno; Toshiharu Okamoto; Kazutoshi Hamada, all of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/147,968

(22) PCT Filed: Jul. 27, 1998

(86) PCT No.: PCT/JP98/03330
§ 371 (c)(1),
(2), (4) Date: Mar. 24, 1999

(87) PCT Pub. No.: WO99/05737
PCT Pub. Date: Feb. 4, 1999

(51) Int. Cl.$^7$ .................................................. H01M 2/16
(52) U.S. Cl. .............................. 429/34; 429/38; 429/39
(58) Field of Search ................................ 429/34, 38, 39

(56) References Cited

U.S. PATENT DOCUMENTS

| | | | | |
|---|---|---|---|---|
| 4,958,998 A | * | 9/1990 | Yamauchi et al. | 423/445 |
| 5,071,631 A | * | 12/1991 | Takabatake | 423/445 |
| 5,776,633 A | * | 7/1998 | Mrotek et al. | 429/218 |
| 5,863,468 A | * | 1/1999 | Czubarow et al. | 252/519.5 |
| 5,879,827 A | * | 3/1999 | Debe et al. | 429/40 |
| 6,103,413 A | * | 8/2000 | Hinton et al. | 429/32 |

FOREIGN PATENT DOCUMENTS

| | | | |
|---|---|---|---|
| JP | 359213610 A | * | 12/1984 |
| JP | 60-246568 A | | 12/1985 |
| JP | 62-147662 A | | 4/1987 |
| JP | 62-252073 A | | 11/1987 |
| JP | 363218159 A | * | 9/1988 |
| JP | 407282811 A | * | 10/1995 |

* cited by examiner

Primary Examiner—Tom Dunn
Assistant Examiner—Kiley Stoner
(74) Attorney, Agent, or Firm—Kubovcik & Kubovcik

(57) ABSTRACT

The present invention provides a separator for fuel cell which alleviates the problems of the prior art, which has high conductivity, high gas impermeability and high strength, and which can be produced easily. The separator for fuel cell according to the present invention is a molding comprising a conductive carbon powder and a polymer compound, wherein the conductive carbon powder in the molding has an aspect ratio of 4 to 60.

10 Claims, No Drawings

SEPARATOR FOR FUEL CELLS

TECHNICAL FIELD

The present invention relates to a separator for fuel cell, particularly a separator for polymer electrolyte fuel cell.

BACKGROUND ART

Fuel cells have various merits. For example, use of fossil fuel (to which resource impoverishment attention must be paid) is not substantially necessary; substantially no noise is made during power generation; and the recovery of energy can be made high as compared with other fuel power-generating systems. Therefore, fuel cells are being developed for use as a relatively small power generator for buildings or factories or as an electric source for pollution-free vehicles.

Of the parts constituting a fuel cell, the separator has functions of securing paths for a reaction gas entering the fuel cell, transferring the electric energy produced in the fuel cell, to outside, and radiating the heat generated in the fuel cell, to outside. To fulfill these functions, the fuel cell separator is required to have high conductivity, high gas impermeability, high strength, etc.

As the material for fuel cell separator, there has been used high-density graphite impregnated with a thermosetting resin, or graphite having a glassy carbon layer thereon.

Of these conventional materials, the graphite impregnated with a thermosetting resin has problems. That is, a step of impregnation and subsequent drying must be repeated a plurality of times in order to obtain a desired gas barrier property; moreover, machining is necessary for forming paths for reaction gas, in the graphite, which incurs a high cost.

The graphite having a glassy carbon layer thereon has problems as well. That is, it is necessary to repeat impregnation and subsequent drying a plurality of times as in the case of the above-mentioned graphite and then conduct firing in a non-oxidizing atmosphere, or to form a glassy carbon layer on graphite by CVD, which makes the production process complicated; machining is necessary for forming paths for reaction gas, in the graphite, which incurs a high cost; moreover, use of graphite results in a large density and makes large the total weight of fuel cell.

Under such a situation, with a view to providing a fuel cell separator of lower cost, there was proposed a process for production of separator, which comprises molding a mixture of a carbon powder (as a conductive powder) and a special thermosetting resin (as a binder) (Japanese Patent Publication No. 57466/1989). This process, however, has problems. That is, as the binder, there is needed a very special phenolic resin having a paraxylene bond in the molecular chain; a long time is required for preheating, making complicated the process; and the separator obtained is inferior in conductivity and gas barrier property.

For improvement in conductivity, there was also proposed a process for production of fuel cell separator, which comprises molding a mixture of a graphite powder having an aspect ratio of 3 or less and a desired particle size, and a thermosetting resin (Japanese Patent Publication No. 340/1989). This process, however, has a problem in that since the graphite powder has a small aspect ratio, the arrangement thereof is bad and the fuel cell separator obtained is inferior in mechanical strengths and gas impermeability.

The present invention has been made to alleviate the above-mentioned problems of the prior art and provide a fuel cell separator which has high conductivity, high gas impermeability and high strength and which can be produced easily.

DISCLOSURE OF THE INVENTION

In order to achieve the above object, the present invention provides a separator for fuel cell, which is a molding comprising a conductive carbon powder and a polymer compound, wherein the conductive carbon powder in the molding has an aspect ratio of 4 to 60, preferably 10 to 30.

That is, in order to achieve the above object, the present inventors made a study. As a result, the present inventors came to an idea that a conductive carbon powder having a given aspect ratio, when mixed with a polymer compound such as thermosetting resin, thermoplastic resin, rubber or the like, might have very high miscibility with the polymer compound and, when the mixture is molded, might be easily arranged in the same direction; as a result, the contact area between conductive carbon powder particles might increase and a fuel cell separator having excellent properties might be obtained by molding the mixture. A further study was made, and the present invention has been completed.

BEST MODE FOR CARRYING OUT THE INVENTION

The present invention is hereinafter described in detail.

The fuel cell separator of the present invention is the same as conventional fuel cell separators in that it has, as necessary, grooves for feeding an oxidizing agent gas or a fuel gas, at one or both sides.

It is necessary that the fuel cell separator of the present invention is a molding comprising a conductive carbon powder and a polymer compound and that the conductive carbon powder used for production of the molding has an aspect ratio of 4 to 60.

The aspect ratio is a ratio of the major axis and minor axis of particle and is determined, for example, by taking a microphotograph of the conductive carbon powder or the like using a scanning type electron microscope and measuring the major axis and minor axis of each particle constituting the powder.

In the present invention, when the conductive carbon powder has an aspect ratio of 4 or more, the particles of the powder can have sufficient contact with each other and thereby a desired conductivity can be obtained. A conductive carbon powder having an aspect ratio of more than 60 is very costly to produce and therefore is not realistic. The aspect ratio of the carbon powder is preferably 10 to 30 because it can give a separator of higher strength.

The conductive carbon powder used in the present invention can be exemplified by scaly graphite, amorphois graphite and artificial graphite. These conductive carbon powders can be used as they are, as long as they have an aspect ratio falling in the above range. When these conductive carbon powders have an aspect ratio not falling in the above range, they can be made usable in the present invention by allowing them to have the above aspect ratio, by a grinding means such as mixer, jet mill, ball mill, pin mill, freeze-grinding or the like.

The conductive carbon powder ground as above is as necessary subjected to classification by a conventional means such as vibrating screen, Ro-tex screener, sonic screen, microclassifier, forced vortex air classifier or the like to remove the particles having an average particle diameter of smaller than 0.1 $\mu$m or larger than 100 $\mu$m, preferably smaller than 1 $\mu$m or larger than 80 $\mu$m and an aspect ratio of smaller than 4 or larger than 60, whereby a conductive carbon powder usable in the present invention can be obtained.

As the polymer compound usable-in the present invention for production of the molding, there can be mentioned one kind or a mixture of two or more kinds, selected from thermosetting resins, thermoplastic resins and rubbers. Of these, the thermosetting resins can be, for example, polycarbodiimide resin, phenolic resin, furfuryl alcohol resin, epoxy resin, cellulose, urea resin, melamine resin, bismaleimidetriazine resin, unsaturated polyester, silicone resin, diallyl phthalate resin, polyaminobismaleimide resin and aromatic polyimide.

The thermoplastic resins can be, for example, polyethylene, polystyrene, polypropylene, polymethyl methacrylate, polyethylene terephthalate, polybutylene terephthalate, polyethersulfone, polycarbonate, polyoxamethylene, polyamide, polyimide, polyamideimide, polyvinyl alcohol, polyvinyl chloride, fluroresin, polyphenylsulfone, polyetheretherketone, polysulfone, polyetherketone, polyarylate, polyetherimide, polymethylpentene, polyoxybenzoyl ester, liquid crystal polyester, aromatic polyester, polyacetal, polyallylsulfone, polybenzimidazole, polyethernitrile, polythioethersulfone and polyphenyl ether.

The rubbers can be, for example, fluororubber, silicone rubber, butyl rubber, chloroprene rubber, nitrile rubber, nitrile-chloroprene rubber, chlorinated butyl rubber, chlorinated polyethylene, epichlorohydrin rubber, epichlorohydrin-ethylene oxide rubber, epichlorohydrin-ethylene oxide-acryl glycidyl ether copolymer, urethane rubber, acrylic rubber, ethylene-propylene rubber, styrene rubber, butadiene rubber and natural rubber. By the use of such a rubber, the resulting separator can have higher impact resistance.

The thermosetting resin, the thermoplastic resin and the rubber may be used in appropriate combination.

For improvement in moldability, chemical stability and operational efficiency, there may be added, as necessary, a lubricant, a stabilizer, a crosslinking accelerator, a plasticizer, a vulcanizing agent, etc.

The fuel cell separator of the present invention is produced as follows. First, the conductive carbon powder is mixed with the polymer compound. In this mixing step, a known industrial mixing method (e.g. twin roll, monoaxial or biaxial extruder, stirring rod, kneader, pressure kneader, ball mill, sample mill, mixer, static mixer, ribbon mixer or Banbury mixer) can be used. At that time, if the thermosetting resin, the thermoplastic resin, the rubber or the like is soluble in an appropriate solvent, the polymer compound may be beforehand granulated in the presence of such a solvent because the granulated polymer compound can exhibit a high binding effect and improved moldability is obtained in separator production.

Preferably, the conductive carbon powder and the polymer compound are mixed so that the proportions of the conductive carbon powder and the polymer compound at the completion of molding step (i.e. in their molded product) become 100 parts by weight and 10 to 60 parts by weight, respectively. When the proportion of the polymer compound is smaller than 10 parts by weight, the particles of the conductive carbon powder are unable to sufficiently bond with each other, resulting in reduced strength and reduced gas impermeability. When the proportion is larger than 60 parts by weight, the proportion of the conductive carbon powder is smaller, resulting in a separator of larger electrical resistance.

Next, the thus-obtained mixture of the conductive carbon powder and the polymer compound is molded as necessary. This molding step can be conducted by a known method selected from pressure molding, hydrostatic pressure molding, extrusion molding, injection molding, belt press, press molding, press heating, roll pressing or the like, or by a method which is a combination of two or more of them.

The molding temperature can be determined depending upon the kind of the thermosetting resin, thermoplastic resin or rubber used, but can be, for example, a temperature ranging from room temperature to a temperature at which the polymer compound is cured or melted. In order to chemically stabilize the molding obtained, the molding may be subjected to a heat treatment at high temperatures to carbonize the polymer compound of the molding at least partially.

In the present invention, grooves for feeding an oxidizing gas or a fuel gas may be formed at the time of molding the mixture. For example, at least either of the upper die and the lower die (or, the core and the cavity, or the female die and the male die) of the die used is allowed to have surface unevenness corresponding to the intended grooves for feeding a gas, and molding is conducted using such a die.

The present invention is described below in more detail by way of Examples.

EXAMPLES 1 TO 10

A scaly graphite powder (average particle diameter: 50 μm) having an aspect ratio shown in Table 1 and a thermosetting resin or a thermoplastic resin were mixed at weight proportions shown in Table 1, for 10 minutes using a mixer. 200 g of the resulting mixture was placed in a square die of 200 mm×200 mm and pressed by an oil press under the conditions shown in Table 1, to mold into a separator shape having a thickness of 2.2 mm. Each resulting molding was measured for specific resistance, gas impermeability and bending strength. The results are shown in Table 1. Incidentally, conductivity (specific resistance) was measured by a four-probe method, and gas impermeability was measured by the equal pressure method of JIS 7126. Further, each is numerical value shown in the "raw material mixture" row of Table 1 refers to weight parts (the same applies hereinafter).

TABLE 1

|  |  | Examples | | | | | | | | | |
|---|---|---|---|---|---|---|---|---|---|---|---|
|  |  | 1 | 2 | 3 | 4 | 5 | 6 | 7 | 8 | 9 | 10 |
| Raw material mixture | Conductive carbon powder (Aspect ratio 7) | 100 |  |  |  |  |  |  |  |  |  |
|  | (Aspect ratio 15) |  | 100 |  |  |  |  |  |  |  |  |
|  | (Aspect ratio 20) |  |  | 100 |  |  | 100 | 100 | 100 | 100 | 100 |
|  | (Aspect ratio 24) |  |  |  | 100 |  |  |  |  |  |  |
|  | (Aspect ratio 50) |  |  |  |  | 100 |  |  |  |  |  |
|  | Phenolic resin | 35 | 35 | 35 | 35 | 35 | 10 | 50 |  | 35 | 35 |
|  | Polypropylene |  |  |  |  |  |  |  | 35 |  |  |
| Molding temperature (° C.) | | 150 | 150 | 150 | 150 | 150 | 150 | 150 | 180 | 150 | 150 |
| Molding time (min) | | 5 | 5 | 5 | 5 | 5 | 5 | 5 | 5 | 5 | 5 |
| Molding pressure (kg/cm²) | | 200 | 200 | 200 | 200 | 200 | 200 | 200 | 200 | 100 | 500 |

TABLE 1-continued

| | Examples | | | | | | | | | |
|---|---|---|---|---|---|---|---|---|---|---|
| | 1 | 2 | 3 | 4 | 5 | 6 | 7 | 8 | 9 | 10 |
| Specific resistance (mΩcm) | 15 | 10 | 7 | 9 | 16 | 5 | 11 | 8 | 11 | 5 |
| Gas impermeability (ml/m² · day · atm) | 50 | 7 | 6 | 8 | 42 | 10 | 2 | 10 | 14 | 3 |
| Bending strength (kgf/cm²) | 376 | 430 | 570 | 446 | 320 | 400 | 600 | 450 | 500 | 640 |

EXAMPLES 11 TO 18

Separators were obtained in the same manner as in Examples 1 to 10, using a scaly graphite powder (average particle diameter: 30 μm) having an aspect ratio shown in Table 2 and a polymer compound at weight proportions shown in Table 2. Each molding obtained was measured for specific resistance, gas impermeability and bending strength in the same manners as in Example 1. The results are shown in Table 2.

TABLE 2

| | | Examples | | | | | | | |
|---|---|---|---|---|---|---|---|---|---|
| | | 11 | 12 | 13 | 14 | 15 | 16 | 17 | 18 |
| Raw material mixture | Conductive carbon powder (Aspect ratio 15) | 100 | 100 | 100 | 100 | 100 | 100 | 100 | 100 |
| | Diallyl phthalate resin | 35 | | | | | | | |
| | Epoxy resin | | 25 | 35 | 50 | | | | |
| | Fluororesin | | | | | 35 | | | |
| | Silicone resin | | | | | | 35 | | |
| | Silicone rubber | | | | | | | 35 | |
| | Fluororubber | | | | | | | | 35 |
| Molding temperature (° C.) | | 150 | 150 | 150 | 150 | 350 | 150 | 180 | 200 |
| Molding time (min) | | 5 | 5 | 5 | 5 | 5 | 5 | 8 | 5 |
| Molding pressure (kg/cm²) | | 200 | 200 | 200 | 200 | 200 | 200 | 200 | 200 |
| Specific resistance (mΩcm) | | 30 | 13 | 25 | 23 | 20 | 19 | 21 | 22 |
| Gas impermeability (ml/m² · day · atm) | | 7 | 20 | 8 | 2 | 8 | 10 | 9 | 8 |
| Bending strength (kgf/cm²) | | 370 | 430 | 570 | 600 | 320 | 400 | 300 | 320 |

EXAMPLE 19

A separator of about 2.2 mm in thickness with gas flowfield channels was obtained in the same manner as in Example 1 except that there was used, as the upper part of the mold tool which had gas flowfield channels of 1 mm in depth, 2 mm in width and 2 mm in distance between adjacent flowfield channels. The separator had the same conductivity and gas impermeability as the separator obtained in Example 1.

Comparative Example 1

100 parts by weight of an artificial graphite powder having an aspect ratio of 3 and 35 parts by weight of a phenolic resin were mixed for 10 minutes using a mixer. 200 g of the resulting mixture was placed in a square die of 200 mm×200 mm and pressed by an oil press at 150° C. at 200 kg/cm² for 5 minutes to mold into a separator shape having a thickness of 2.2 mm. The resulting molding was measured for specific resistance, gas impermeability and bending strength in the same manners as in Example 1. The results are shown in Table 3.

Comparative Example 2

100 parts by weight of a scaly graphite powder having an aspect ratio of 70 and 35 parts by weight of a phenolic resin were mixed for 10 minutes using a mixer. 200 g of the resulting mixture was placed in a square die of 200 mm×200 mm and pressed by an oil press at 150° C. at 200 kg/cm² for 5 minutes to mold into a separator shape having a thickness of 2.2 mm. The resulting molding was measured for specific resistance, gas impermeability and bending strength in the same manners as in Example 1. The results are shown in Table 3.

Comparative Examples 3 and 4

Separators were obtained in the same manner as in Example 3 except that the proportion of the phenolic resin was changed to those shown in Table 3, and were evaluated in the same manner as in Example 1. The results are shown in Table 3.

TABLE 3

| | Comparative Examples | | | |
|---|---|---|---|---|
| | 1 | 2 | 3 | 4 |
| Raw material mixture | | | | |
| Conductive carbon powder | | | | |
| (Aspect ratio 3) | 100 | | | |
| (Aspect ratio 20) | | | 100 | 100 |
| (Aspect ratio 70) | | 100 | | |
| Phenolic resin | 35 | 35 | 1 | 70 |
| Molding temperature (° C.) | 150 | 150 | 150 | 150 |
| Molding time (min) | 5 | 5 | 5 | 5 |
| Molding pressure (kg/cm²) | 200 | 200 | 200 | 200 |
| Specific resistance (mΩcm) | 50 | 40 | 27 | 30000 |
| Gas impermeability (ml/m².day.atm) | 200 | 104 | >10⁵ | 60 |
| Bending strength (kgf/cm²) | 200 | 100 | 50 | 300 |

INDUSTRIAL APPLICABILITY

As is clear from the above Examples, the fuel cell separator of the present invention has high conductivity;

therefore, when used in a fuel cell, it can give a fuel cell of high output. Moreover, having high gas impermeability, it can give a fuel cell of high power generation efficiency.

Having high strength, the fuel cell separator of the present invention can sufficiently withstand the tightening pressure applied at the time of fuel cell assembling, even when a fuel cell consisting of a large number of cells is assembled. With the separator of the present invention, the fuel cell stack containing electrodes and separators can be tightened strongly; this, together with the high gas impermeability of the present separator, can greatly reduce the gas leakage from the stack; therefore, high power generation efficiency and high safety can be achieved.

Further, the present separator is simple to produce and can be produced easily.

What is claimed is:

1. A separator for fuel cell, which is a molding comprising a conductive powder and a polymer compound, wherein the conductive carbon powder in the molding has an aspect ratio of 4 to 60, and wherein the molding comprises 100 parts by weight of the conductive carbon powder and 10 to 60 parts by weight of the polymer compound.

2. A separator for fuel cell according to claim 1, which has grooves for feeding an oxidizing agent gas or a fuel gas, at one or both sides.

3. A separator for fuel cell according to claim 1, wherein the polymer compound is one kind or a mixture of two or more kinds, selected from thermosetting resins, thermoplastic resins and rubbers.

4. A separator for fuel cell according to claim 3, which has grooves for feeding an oxidizing agent gas or a fuel gas, at one or both sides.

5. A separator for fuel cell, which is a molding comprising a conductive carbon powder and a polymer compound, wherein the conductive carbon powder in the molding has an aspect ratio of 10 to 30.

6. A separator for fuel cell according to claim 5, wherein the polymer compound is one kind or a mixture of two or more kinds, selected from thermosetting resins, thermoplastic resins and rubbers.

7. A separator for fuel cell according to claim 6, which has grooves for feeding an oxidizing agent gas or a fuel gas, at one or both sides.

8. A separator for fuel cell according to claim 5, which has grooves for feeding an oxidizing agent gas or a fuel gas, at one or both sides.

9. A separator for fuel cell according to claim 5, wherein the molding comprises 100 parts by weight of the conductive carbon powder and 10 to 60 parts by weight of the polymer compound.

10. A separator for fuel cell according to claim 9, which has grooves for feeding an oxidizing agent gas or a fuel gas, at one or both sides.

* * * * *